United States Patent
Wu et al.

(10) Patent No.: US 10,177,554 B2
(45) Date of Patent: Jan. 8, 2019

(54) INRUSH CURRENT LIMITATION CIRCUIT AND METHOD

(71) Applicant: DELL PRODUCTS, LP, Round Rock, TX (US)

(72) Inventors: Feng-Yu (Wickman) Wu, Taipei (TW); Tsai-Fu (Hans) Hung, Taipei (TW)

(73) Assignee: Dell Products, LP, Round Rock, TX (US)

( * ) Notice: Subject to any disclaimer, the term of this patent is extended or adjusted under 35 U.S.C. 154(b) by 293 days.

(21) Appl. No.: 15/048,632

(22) Filed: Feb. 19, 2016

(65) Prior Publication Data

US 2017/0244236 A1 Aug. 24, 2017

(51) Int. Cl.
*H02H 3/08* (2006.01)
*G06F 1/30* (2006.01)
*H02H 9/00* (2006.01)

(52) U.S. Cl.
CPC .............. *H02H 3/08* (2013.01); *G06F 1/305* (2013.01); *H02H 9/001* (2013.01); *H02H 9/002* (2013.01); *H02H 9/004* (2013.01)

(58) Field of Classification Search
USPC .................................. 361/86–87, 93.7–93.9
See application file for complete search history.

(56) References Cited

U.S. PATENT DOCUMENTS

| | | | |
|---|---|---|---|
| 4,291,204 A * | 9/1981 | Crick | G01R 31/10 324/456 |
| 7,787,271 B2 | 8/2010 | Popescu et al. | |
| 2006/0132105 A1* | 6/2006 | Prasad | H02M 1/4225 323/222 |
| 2006/0274468 A1 | 12/2006 | Phadke | |
| 2014/0009134 A1* | 1/2014 | Bernardon | H02M 1/36 323/284 |

* cited by examiner

*Primary Examiner* — Danny Nguyen
(74) *Attorney, Agent, or Firm* — Larson Newman, LLP

(57) ABSTRACT

A method and circuit for a power supply unit (PSU) suitable for use in an information handling system to detect an inrush current reaching an inrush current threshold, to fully turning off, by a control circuit of the PSU, a series transistor to block the inrush current, to transfer, while the series transistor is fully turned off, magnetic energy stored in a boost choke to a bulk capacitor, and to fully turn on, by the control circuit of the PSU, the series transistor again immediately after the series transistor was in a fully turned off state, wherein the fully turning on occurs after the magnetic energy stored in the boost choke has been transferred to the bulk capacitor.

20 Claims, 5 Drawing Sheets

INRUSH CURRENT LIMITATION CIRCUIT AND METHOD

FIELD OF THE DISCLOSURE

The present disclosure generally relates to information handling systems, and more particularly relates to limiting inrush current of a power supply unit (PSU).

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

An information handling system typically requires power to operate. Such power is supplied by a power supply unit (PSU). To provide clean, stable power, a PSU typically includes a bulk capacitor, such as an electrolytic capacitor, to serve as a reservoir of electric charge. Such a reservoir can accept additional charge beyond that drawn for use by the various elements of the information handling system and can provide charge drawn by the elements of the information handling system during brief disruptions of the input power received by the PSU. The period of time during which a PSU can continue to provide power to the elements of the information handling system without itself being supplied with input power is known as the hold up time.

If input power is disrupted for a substantial portion of the hold up time, the amount of charge stored in the reservoir is reduced by the power that continues to be supplied to the elements of the information handling system. When input power is restored to the PSU, a depleted reservoir can draw a large amount of current to refill itself with charge. Such current can be referred to as resumed inrush current, as it rushes in when the normal operation is resumed by the restoration of input power.

Large resumed inrush current may overload components used to handle the supply of current and can trigger over current protection, such as tripping a circuit breaker (e.g., an alternating current (AC) circuit breaker). The tripping of a circuit breaker or the failure of a component from too much current can cause the unexpected stoppage or failure of an information handling system.

Another type of inrush current is initial inrush current, which occurs when power is initially applied to a PSU. As the reservoir, such as a bulk capacitor, is initially empty, it initially tends to draw a large amount of initial inrush current. It is possible to add a resistor or a temperature-sensitive device, such as a positive temperature coefficient (PTC) or negative temperature coefficient (NTC) resistor, in series with and before a bridge diode to limit the initial inrush current based on power dissipation of the temperature-sensitive device resulting from the initial inrush current. However, it can be undesirable to have the resistor or temperature-sensitive device in the circuit during normal operation after the brief initial inrush current has subsided, so the additional cost and complexity of another device, such as a relay across the temperature-sensitive device, is typically incurred to bypass the resistor or temperature-sensitive device during normal operation.

However by bypassing the resistor or temperature-sensitive device, the circuit is unprepared to respond to resumed inrush current during brief disruptions of input power during normal operation. If the alternating current (AC) line drops out and then resumes, high AC resumed inrush current can occur and can be greater than the initial inrush current if a current limiting PTC/NTC resistor is still bypassed by a relay.

While a typical hold up time may be, for example, 10 mS, a PSU designed to provide a longer hold up time can exacerbate inrush current problems, as the amounts of energy depleted from the reservoir over the longer hold up time can be greater. As examples, a hold up time of 20 mS according to an Information Technology Industry Council (ITI) curve and a hold up time of 30 mS for a special feature set may bring risks, such as triggering AC breaker over current protection unexpectedly if several PSUs are in parallel and damaging input devices such as a fuse, a bridge diode, and a power factor correction (PFC) bypass diode. If a PFC bypass diode is rated for 3A of forward current, a 600V peak reverse voltage, it may have a maximum surge forward current of, for example, 100A. The maximum surge forward current is typically limited to short duration, such as a non-repetitive half cycle of the AC sine wave it is rectifying. However, the magnitudes of current typically associated with inrush currents, which can exceed, for example, 100A, can result in failures of PFC bypass diodes.

SUMMARY

A method and circuit for a power supply unit (PSU) suitable for use in an information handling system to detect an inrush current reaching an inrush current threshold, to fully turning off, by a control circuit of the PSU, a series transistor to block the inrush current, to transfer, while the series transistor is fully turned off, magnetic energy stored in a boost choke to a bulk capacitor, and to fully turn on, by the control circuit of the PSU, the series transistor again immediately after the series transistor was in a fully turned off state, wherein the fully turning on occurs after the magnetic energy stored in the boost choke has been transferred to the bulk capacitor.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
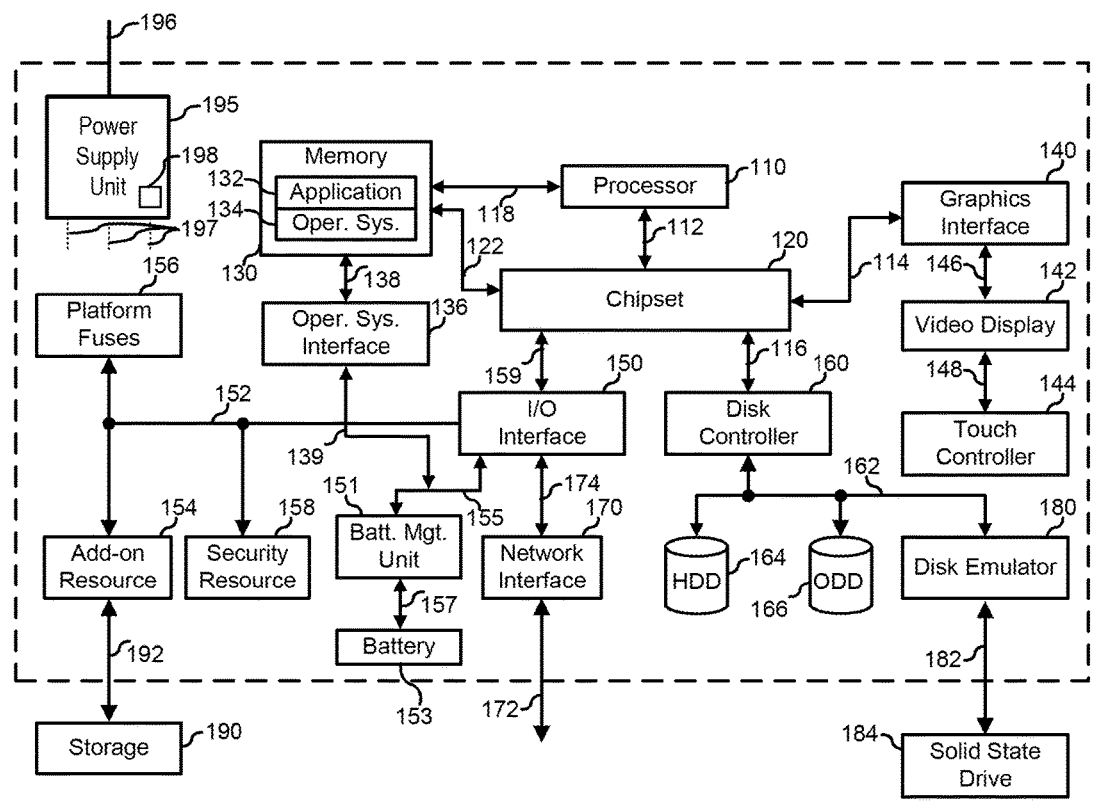
FIG. 1 is a block diagram illustrating an information handling system according to an embodiment of the present disclosure.

FIG. 1 shows a generalized embodiment of information handling system 100. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described above, and operates to perform one or more of the methods described above. Information handling system 100 includes a processor 110, a chipset 120, a memory 130, a graphics interface 140, include an operating system interface 136, a disk controller 160, a disk emulator 180, an input/output (I/O) interface 150, and a network interface 170. Processor 110 is connected to chipset 120 via processor interface 112. Processor 110 is connected to memory 130 via a memory bus 118. Memory 130 is connected to chipset 120 via a memory bus 122. Memory 130 comprises memory storing an application 132 and memory storing an operating system 134. Memory 130 is connected to operating system interface 136 by operating system interface connection 138. Operating system interface 136 is connected to a connection 155 between I/O interface 150 and battery management unit 151 by connection 139. Battery management unit 151 is connected to battery 153 via battery connection 157. Graphics interface 140 is connected to chipset 120 via a graphics interface 114, and provides a video display output 146 to a video display 142. Video display 142 is connected to a touch controller 144 via touch controller connection 148. An example of memory 130 includes random access memory (RAM) such as static RAM (SRAM), dynamic RAM (DRAM), non-volatile RAM (NV-RAM), or the like, read only memory (ROM), another type of memory, or a combination thereof.

Disk controller 160 is connected to chipset 120 via disk controller interface 116. I/O interface 150 is connected to chipset 120 via an I/O channel 159. An example of I/O channel 166 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 120 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof.

Disk controller 160 includes a disk interface 162 that connects the disc controller to a hard disk drive (HDD) 164, to an optical disk drive (ODD) 166, and to disk emulator 180. An example of disk interface 162 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 180 permits a solid-state drive 184 to be connected to information handling system 100 via an external interface 182. An example of external interface 162 includes a USB interface, an IEEE 1194 (Firewire) interface, a proprietary interface, or a combination thereof. Alternatively, solid-state drive 184 can be disposed within information handling system 100.

I/O interface 150 is connected to a network interface 170 via connection 174. Network interface 170 connects to a network via network connection 172. I/O interface 150 includes a peripheral interface 152 that connects the I/O interface to an add-on resource 154, to a security resource 158, and to platform fuses 156. Add-on resource 154 can connect to, for example, external storage 190 via external connection 192. Peripheral interface 152 can be the same type of interface as I/O channel 159, or can be a different type of interface. As such, I/O interface 170 extends the capacity of I/O channel 159 when peripheral interface 152 and the I/O channel are of the same type, and the I/O interface translates information from a format suitable to the I/O channel to a format suitable to the peripheral channel 152 when they are of a different type. Add-on resource 154 can include a data storage system, an additional graphics interface, a network interface card (NIC), a sound/video processing card, another add-on resource, or a combination thereof. Add-on resource 154 can be on a main circuit board, on separate circuit board or add-in card disposed within information handling system 100, a device that is external to the information handling system, or a combination thereof.

Network interface 170 represents a NIC disposed within information handling system 100, on a main circuit board of the information handling system, integrated onto another component such as chipset 110, in another suitable location, or a combination thereof. Network interface device 170 includes network channel 172 that provides an interface to devices that are external to information handling system 100. In a particular embodiment, network channel 172 is of a different type than peripheral channel 152 and network interface 170 translates information from a format suitable to the peripheral channel to a format suitable to external devices. An example of network channel 172 includes InfiniBand channels, Fibre Channel channels, Gigabit Ethernet channels, proprietary channel architectures, or a combination thereof. Network channel 172 can be connected to external network resources (not illustrated). The network resource can include another information handling system, a data storage system, another network, a grid management system, another suitable resource, or a combination thereof Power supply unit (PSU) 195 provides power to other elements of information handling system 100. PSU 195 receives a power input 196 and provides power outputs 197. PSU 195 comprises an inrush current limitation circuit 198, which may be used to limit initial inrush current, resumed inrush current, or both, as will be discussed below in more detail with respect to other FIGs.

Figure 2:
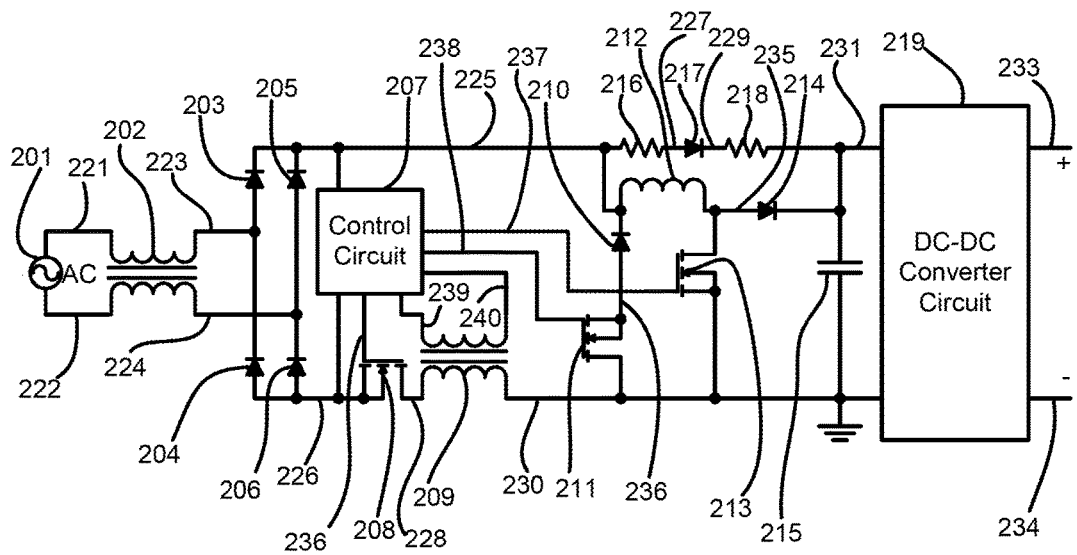
FIG. 2 is a schematic diagram illustrating a circuit according to an embodiment of the present disclosure.

FIG. 2 shows a circuit according to an embodiment of the present disclosure. The circuit of FIG. 2 may be implemented as a PSU, for example a PSU for an information handling system. An alternating current (AC) power source 201 is applied via AC line conductors 221 and 222, through electromagnetic interference (EMI) filter 202, then via AC input conductors 223 and 224 to the bridge diode comprising diodes 203, 204, 205, and 206. Diode 203 conducts when AC input conductor 223 is positive relative to positive voltage supply conductor 225. Diode 204 conducts when AC input conductor 223 is negative relative to negative voltage supply conductor 226. Diode 205 conducts when AC input conductor 223 is positive relative to positive voltage supply conductor 225. Diode 206 conducts when AC input conductor 224 is negative relative to negative voltage supply conductor 226. Thus, diodes 203 and 205 provide full wave rectification to supply power to positive voltage supply conductor 225, and diodes 204 and 206 provide full wave rectification to supply power to negative voltage supply conductor 226.

Positive voltage supply conductor 225 is connected to control circuit 207, to a first terminal of power factor correction (PFC) choke 212, to the cathode of magnetic energy shunt diode 210, and to a first terminal of voltage dropping resistor 216. Negative voltage supply conductor 226 is connected to control circuit 207, to a source terminal of series transistor 208, which may, for example, be a n-channel metal oxide semiconductor field effect transistor (MOSFET). A gate terminal 236 of series transistor 208 is connected to control circuit 207. A drain terminal of series transistor 208 is connected to a first terminal of a sensed winding of inductive current sensor 209 via conductor 228. A second terminal of the sensed winding of inductive current sensor 209 is connected to a ground potential 230, which is connected to a drain terminal of magnetic energy shunt transistor 211, which may, for example, be a n-channel MOSFET, to a source terminal of boost transistor 213, which may, for example, be a n-channel MOSFET, to a negative terminal of bulk capacitor 215, and to a negative voltage input terminal of current to direct current (DC-DC) converter circuit 219.

A first terminal 239 of a sensing winding of inductive current sensor 209 is connected to control circuit 207. A second terminal 240 of the sensing winding of the inductive current sensor 209 is connected to control circuit 207. A gate terminal 238 of magnetic energy shunt transistor 211 is connected to control circuit 207. A gate terminal 237 of boost transistor 213 is connected to control circuit 207. The anode terminal of magnetic energy shunt diode 210 is connected to a drain terminal of magnetic energy shunt transistor 211 at node 236. A second terminal of PFC choke 212 is connected to the anode terminal of boost diode 214 and to a drain terminal of boost transistor 213 at node 235. A second terminal of voltage dropping resistor 216 is connected to the anode terminal of current sensing diode 217. The cathode terminal of current sensing diode 217 is connected to a first terminal of current sensing resistor 218. A second terminal of current sensing resistor 218 is connected to a positive terminal of bulk capacitor 215, to the cathode terminal of boost diode 214, and to a positive voltage input of DC-DC converter circuit 219 at node 231. DC-DC converter circuit 219 provides a positive voltage output terminal 233 and a negative voltage output terminal 234.

As the inductance of PFC choke 212 opposes changes in current flow, it opposes the increase in inrush current when power is initially applied at AC power source 201, when power is subsequently restored at AC power source 201, or when series transistor 208, which can be used to stop the flow of excessive inrush current, is restored to its conducting state. As the inductance of PFC choke 212 opposes the inrush current, the voltage across PFC choke 212 increases, a current sensing circuit in the form of a rectified voltage divider comprising voltage dropping resistor 216, current sensing diode 217, and current sensing resistor 218 in series are disposed across the series combination of PFC choke 212 and boost diode 214 to allow measurement, for example, by control circuit 207, of a current sensing voltage across current sensing resistor 218 indicative of the magnitude of the inrush current. Thus, control circuit 207 can monitor inrush current.

As another example, control circuit 207 can measure the voltage through inductive current sensor 209 to determine current flow, including inrush current flow, when series transistor 208 is conducting. As examples, current sensor 209 may be implemented as a sense winding, a sense resistor, or a hall effect sensor. Current flow through the sensed winding of inductive current sensor 209 induces a voltage across first terminal 239 and second terminal 240 of the sensing winding of inductive current sensor 209. That voltage can be measured by control circuit 207 to measure the current flowing through the sensed winding of inductive current sensor 209. In response, control circuit 207 can control the gate terminals of series transistor 208, magnetic energy shunt transistor 211, and boost transistor 213 to prevent excessive inrush current from flowing. While both current sensing resistor 218 and inductive current sensor 209 may be provided, other embodiments may be practiced with one, the other, a different current sensor, or combinations thereof.

Figure 3:
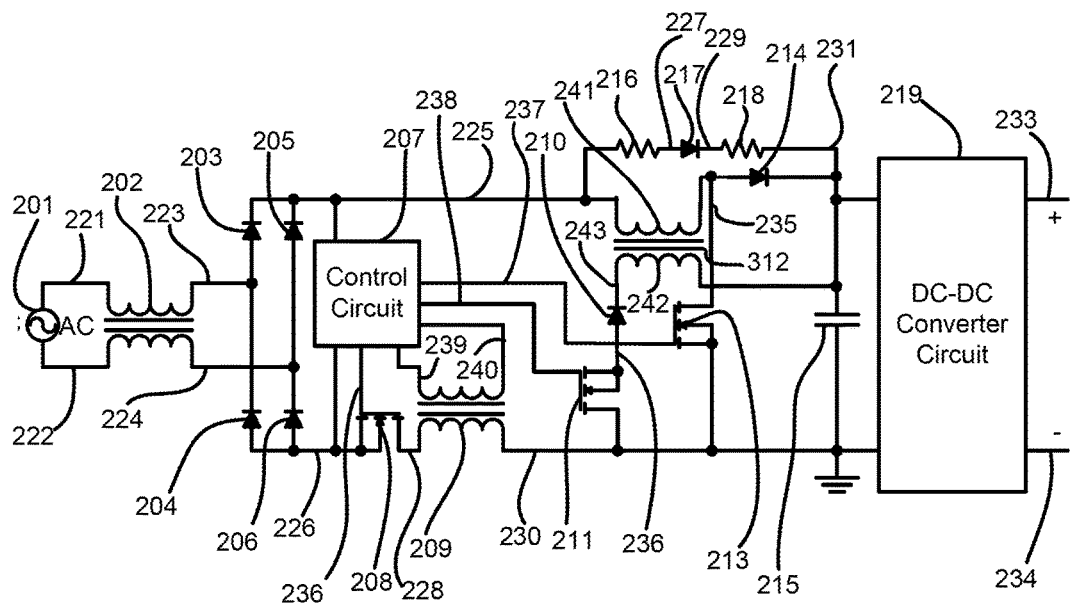
FIG. 3 is a schematic diagram illustrating a circuit according to an embodiment of the present disclosure.

FIG. 3 shows a circuit according to another embodiment of the present disclosure. The circuit of FIG. 3 may be implemented as a PSU, for example a PSU for an information handling system. The circuit of FIG. 3 differs from the circuit of FIG. 2 described above in that PFC choke 312 is implemented with two windings, which include a main winding 241 and a magnetic energy shunt winding 242. A first terminal of main winding 241 is connected to positive voltage supply conductor 225 and the first terminal of voltage dropping resistor 216 but not to the cathode terminal of magnetic energy shunt diode 210. A second terminal of main winding 241 is connected to the anode terminal of boost diode 214 and to a drain terminal of boost transistor 213 at node 235, as in FIG. 2. A first terminal of magnetic energy shunt winding 242 is connected to the cathode terminal of magnetic energy shunt diode 210 at node 243. A second terminal of magnetic energy shunt winding 242 is connected to the positive terminal of bulk capacitor 215, to the cathode terminal of boost diode 214, to the second terminal of current sensing resistor 218, and to a positive voltage input of DC-DC converter circuit 219 at node 231. Thus, the anode terminal of boost diode 214 is connected to the second terminal of the main winding 241 of PFC choke 312, and the cathode terminal of boost diode 214 is connected to the second terminal of the magnetic energy shunt winding 242 of PFC choke 312.

During normal operation of the circuit of FIG. 3, the main winding 241 of PFC choke 312 is used to draw energy from the bridge diode and to store the energy as a magnetic field in PFC choke 312 when boost transistor 213 is conducting, then to release the energy from the magnetic field through boost diode 214 into bulk capacitor 215 when boost transistor 213 is not conducting. However, during times of high inrush current, control circuit 207 causes boost transistor 213 not to conduct and allows the relatively low voltage of bulk capacitor 215 to temporarily pull the inrush current through main winding 241 via boost diode 214 to charge bulk capacitor 215.

When the inrush current reaches an inrush current threshold, control circuit 207 causes magnetic energy shunt transistor 211 to conduct and stops series transistor 208 from conducting, such that the high inrush current ceases and the energy of the magnetic field of PFC choke 312 is released from PFC choke 312 via magnetic energy shunt winding 242 and used to charge bulk capacitor 215 through the circuit completed by magnetic energy shunt diode 210 and magnetic energy shunt transistor 211 in its conducting state. The low effective series resistance (ESR) of bulk capacitor 215 and the overall low impedance of magnetic energy shunt winding 242, magnetic energy shunt diode 210, magnetic energy shunt transistor 211, and bulk capacitor 215 allow the magnetic energy to be removed from PFC choke 312 very rapidly with an energy releasing slew rate equal to the voltage at node 231 divided by the inductance of magnetic energy shunt winding 242.

Then, after certain interval of time, which may be a fixed time or a variable time being controlled by output current, depending on whether a discontinuous conduction mode (DCM) or a continuous conduction mode (CCM) discharge mode is to be used for the boost circuit, control circuit 207 again causes series transistor 208 to conduct and to charge bulk capacitor 215 with magnetic energy shunt diode 210 being reverse biased to disconnect magnetic energy shunt winding 242 even if control circuit 207 has not yet turned off magnetic energy shunt transistor 211 via gate terminal 238. After several cycles of interrupting inrush current that has reached the inrush current threshold, eventually the charging of the bulk capacitor reduces the inrush current to the point where it no longer reaches the inrush current threshold. At that point, control circuit can leave series transistor 208 conducting, magnetic energy shunt transistor 211 non-conducting, and boost transistor 213 switching periodically to provide normal steady state operation of the boost feature provided by PFC choke 312.

Figure 4:
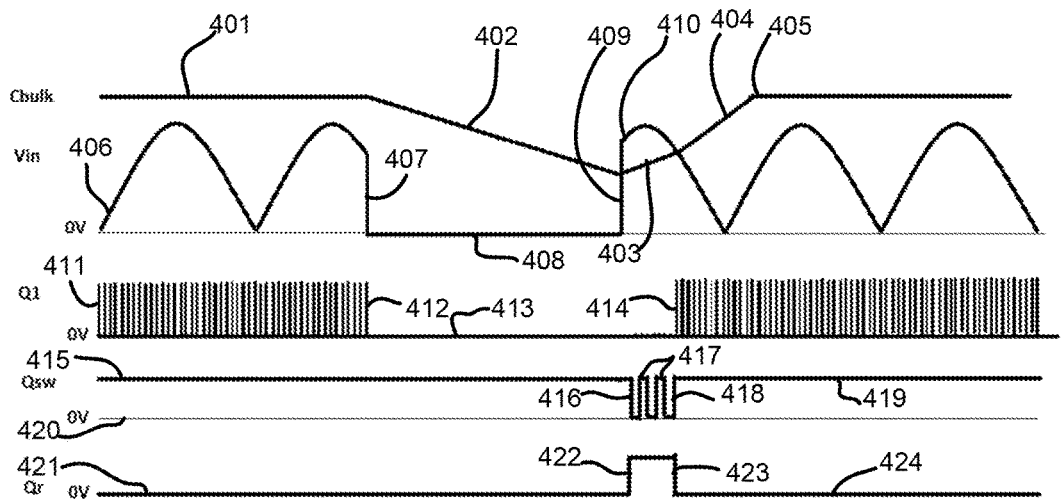
FIG. 4 is a timing diagram illustrating waveforms during a resumed inrush current event according to an embodiment of the present disclosure.

FIG. 4 is a timing diagram illustrating waveforms during a resumed inrush current event according to an embodiment of the present disclosure. At the earliest time shown for the depicted waveforms, full wave rectified AC voltage 406 is being provided by the bridge diode as shown by voltage waveform 406, boost transistor 213 is switching repetitively as shown by voltage waveform 411, series transistor 208 is conducting as shown by non-zero voltage level 415 with respect to zero voltage reference level 420, and magnetic energy shunt transistor 211 is non-conducting as shown by zero voltage level 421. Bulk capacitor voltage level 401 depicts a fully charged bulk capacitor 215. After a time, the AC power source 201 stops providing power momentarily, and the full wave rectified AC voltage 406 drops abruptly at falling edge 407. Without power applied to PFC choke 212 or 312, operation of boost transistor 213 ceases at falling edge 412, resulting in steady voltage level 413. Optionally, operation of boost transistor 213 may continue until the voltage across bulk capacitor 215 falls to a minimal operational level, for example, 320 volts. Control circuit 207 can use current sensing resistor 218 or inductive current sensor 209 to observe the loss of current flow and can control boost transistor 213 to maintain a non-conducting state after the loss of AC power occurs. Without charging current applied to bulk capacitor 215, but with its load still drawing a discharging current, bulk capacitor 215 has a declining voltage as shown by bulk capacitor voltage waveform 402, while full wave rectified AC voltage 408 remains well below its normal full wave rectified AC voltage 406, for example, at zero volts.

When power is restored at AC power source 201, full wave rectified AC voltage 410 is restored, which can happen abruptly and at any arbitrary phase (e.g., not aligned with a zero crossing of the AC voltage of AC power source 201, as shown by abrupt rising edge 409. In response to control circuit 207 detecting the restoration of full wave rectified AC voltage 410, control circuit 207 causes magnetic energy shunt transistor 211 to conduct, as shown by rising edge 422. As series transistor 208 is conducting, as shown by non-zero voltage level 415, full wave rectified AC voltage 410, which is higher than bulk capacitor voltage waveform 402, motivates a large surge of inrush current to begin.

Initially, the inrush current is opposed by the inductance of PFC choke 212 or 312. However, as more inrush current flows, the rate of change of the inrush current (e.g., di/dt) increases, since the opposition posed by PFC choke 212 or 312, i.e. effective inductance, diminishes, which allows the inrush current to increase, in accordance with an inductor permeability vs. DC bias curve. If unconstrained, the inrush current could increase to levels that could damage components. However, control circuit 207 can use the current sensing element or elements connected to it as inputs to observe the inrush current reaching an inrush current threshold. In response to the inrush current reaching the inrush current threshold, control circuit 207 can cause series transistor 208 to stop conducting, as shown by falling edge 416.

As magnetic energy shunt diode 210 and magnetic energy shunt transistor 211, in its conducting state, provide a low impedance path for PFC choke 212 or 312 to release the energy stored in its magnetic field as electrical energy, which is transferred rapidly to increase the charge stored in bulk capacitor 215, even if series transistor 208 is placed in a non-conducting state for only a very short time, PFC choke 212 or 312 can be reset to a de-energized state. The PFC choke 312 has a secondary winding 242 which may be configured with different turn rate than main winding 241 to change the de-energizing time relative to a de-energizing time that would result from using a single coil of PFC choke 212 for both energizing and de-energizing PFC choke 312. As an example, a smaller inductance value for secondary winding 242 can result in faster de-energizing.

When PFC choke 212 or 312 de-energized to zero, the circuit is said to operate in a so-called discontinuous current mode (DCM). Otherwise, the circuit is said to operate in a continuous current mode (CCM). For example, if control circuit 207 causes series transistor to resume conducting current prior to PFC choke 212 or 312 being fully de-energized of magnetic energy, CCM operation can be provided. Changing PFC choke 212 or 312 from an energized state to a de-energized state can prevent the magnetic field of PFC choke 212 or 312 from reaching magnetic saturation. Magnetic saturation can be undesirable, as it marks a point at which PFC choke 212 or 312 would stop functioning as an inductor for additional current flowing through it, thereby allowing inrush current values to become very high. When PFC choke 212 or 312 has had time to become de-energized, control circuit 207 can cause series transistor 208 to again conduct until the next iteration of inrush current reaches the inrush current threshold.

The switching of series transistor 208 between conducting and non-conducting states can be performed very rapidly, as shown by rapid pulses 417. As each brief pulse of inrush current below the inrush current threshold adds charge to bulk capacitor 215 and as the additional adding of charge to bulk capacitor 215 occurs through magnetic energy shunt diode 210 and magnetic energy shunt transistor 211 while series transistor 208 is non-conducting, the bulk capacitor voltage 403 of bulk capacitor 215 rises. As the bulk capacitor voltage 403 of bulk capacitor 215 rises, the voltage difference between full wave rectified AC voltage 410 and bulk capacitor voltage 403 is reduced, such that the motivation for a large inrush current subsides.

When control circuit 207 observes that the inrush current no longer reaches the inrush current threshold, as indicated by steady non-zero voltage level 419 following rising edge 418, control circuit 207 causes magnetic energy shunt transistor 211 to stop conducting, as shown by falling edge 423, and re-enables the repetitive switching of boost transistor 213, as shown by boost transistor voltage pulses 414. With magnetic energy shunt transistor 211 not conducting, as shown by zero voltage level 424, and the boost circuit comprising PFC choke 212 or 312, boost diode 214, and boost transistor 213 operating normally to provide charge to bulk capacitor 215, bulk capacitor 215 is gradually charged along bulk capacitor voltage 404 until it reaches its full bulk capacitor voltage 405. Thus, excessive resumed inrush current can be avoided while charging bulk capacitor 215 following a brief disruption to AC power supply 201.

Figure 5:
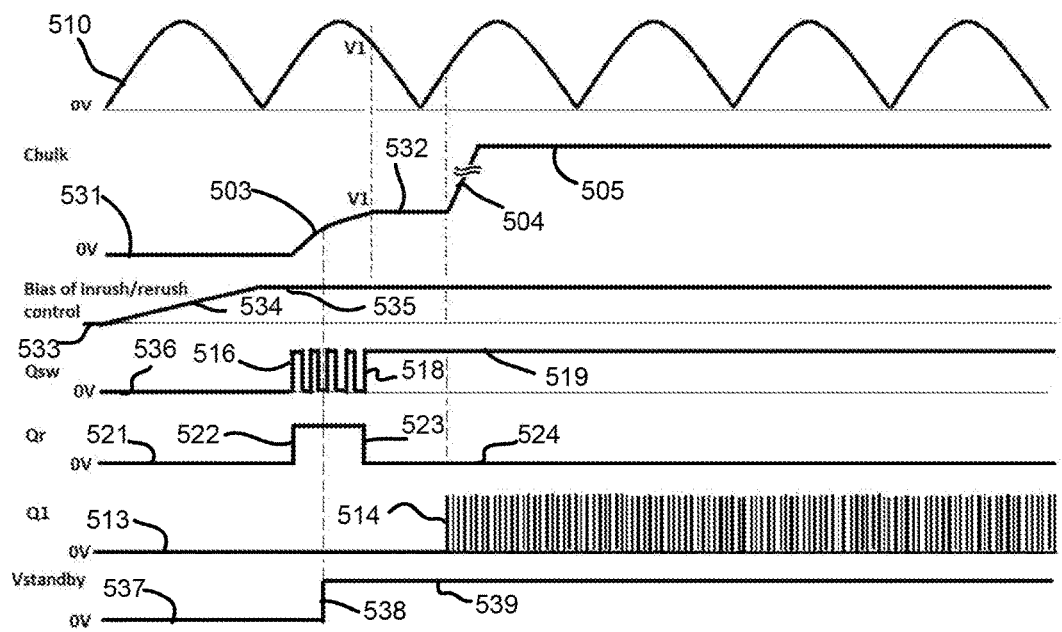
FIG. 5 is a timing diagram illustrating waveforms during an initial inrush current event according to an embodiment of the present disclosure.

FIG. 5 is a timing diagram illustrating waveforms during an initial inrush current event according to an embodiment of the present disclosure. At an initial time, full wave rectified AC voltage 510 is applied while all other illustrated voltages are at zero volts, including bulk capacitor voltage 531, control circuit supply voltage 533, series transistor control voltage 536, magnetic energy shunt transistor control voltage 521, boost transistor control voltage 513, and standby indication voltage 537.

As control circuit 207 uses electricity to provide control signals, a control circuit supply voltage 533 available for control circuit 207 to assert its control signals rises from its initial zero voltage, as rising voltage 534, to reach its full voltage 535, after which control signals can be asserted as described below. Control circuit 207 causes magnetic energy shunt transistor 211 to conduct by raising magnetic energy shunt transistor control voltage 521 at rising edge 522 and causes series transistor 208 to conduct by raising series transistor control voltage 536 at rising edge 516. However, as initial inrush current rises above an inrush current threshold, a current sensing element, such as first end 239 and second end 240 of sensing winding of inductive current sensor 209, provides control circuit 207 with a parameter value, such as a voltage, by which control circuit 207 can determine the inrush current to have reached the inrush current threshold and cause series transistor 208 to stop conducting, stopping the inrush current. With series transistor 208 briefly maintained in a non-conducting state, the magnetic energy stored in PFC choke 212 or 312 is transferred as electrical energy to charge bulk capacitor 215. Bulk capacitor voltage 531 begins to increase as increasing bulk capacitor voltage 503. Control circuit 207 repetitively causes series transistor 208 to fully conduct and then, not to conduct.

When increasing bulk capacitor voltage 503 rises to a level sufficient to allow the PSU to enter into its standby mode, control circuit 207 increases standby indication voltage 537 at rising edge 538 to active indication voltage 539. When the standby mode power setup has been achieved, the power so obtained can be used instead of the original bias of control circuit 207 to reduce power dissipation since power so obtained in the standby mode can have higher efficiency. When bulk capacitor voltage 531 rises sufficiently such that the difference between full wave rectified AC voltage 510 and bulk capacitor voltage 503 does not result in inrush current reaching the inrush current threshold, control circuit 207 causes, at rising edge 518, series transistor 208 to steadily fully conduct at series transistor control voltage level 519 and causes, at falling edge 523, magnetic energy shunt transistor 211 to be in a non-conducting state at magnetic energy shunt transistor control voltage level 524. As control circuit 207 has not yet caused boost transistor 213 to repetitively pulse its conduction for normal operation of the boost circuit, bulk capacitor voltage 503 reaches a voltage level 532 pending initiation of operation of boost transistor 213. At rising edge 514, control circuit 207 begins repetitively pulsing boost transistor control voltage 513 to initiate normal operation of the boost circuit. Accordingly, a bulk capacitor voltage rise 504 occurs, charging bulk capacitor 215 to its full bulk capacitor voltage 505.

Figure 6:
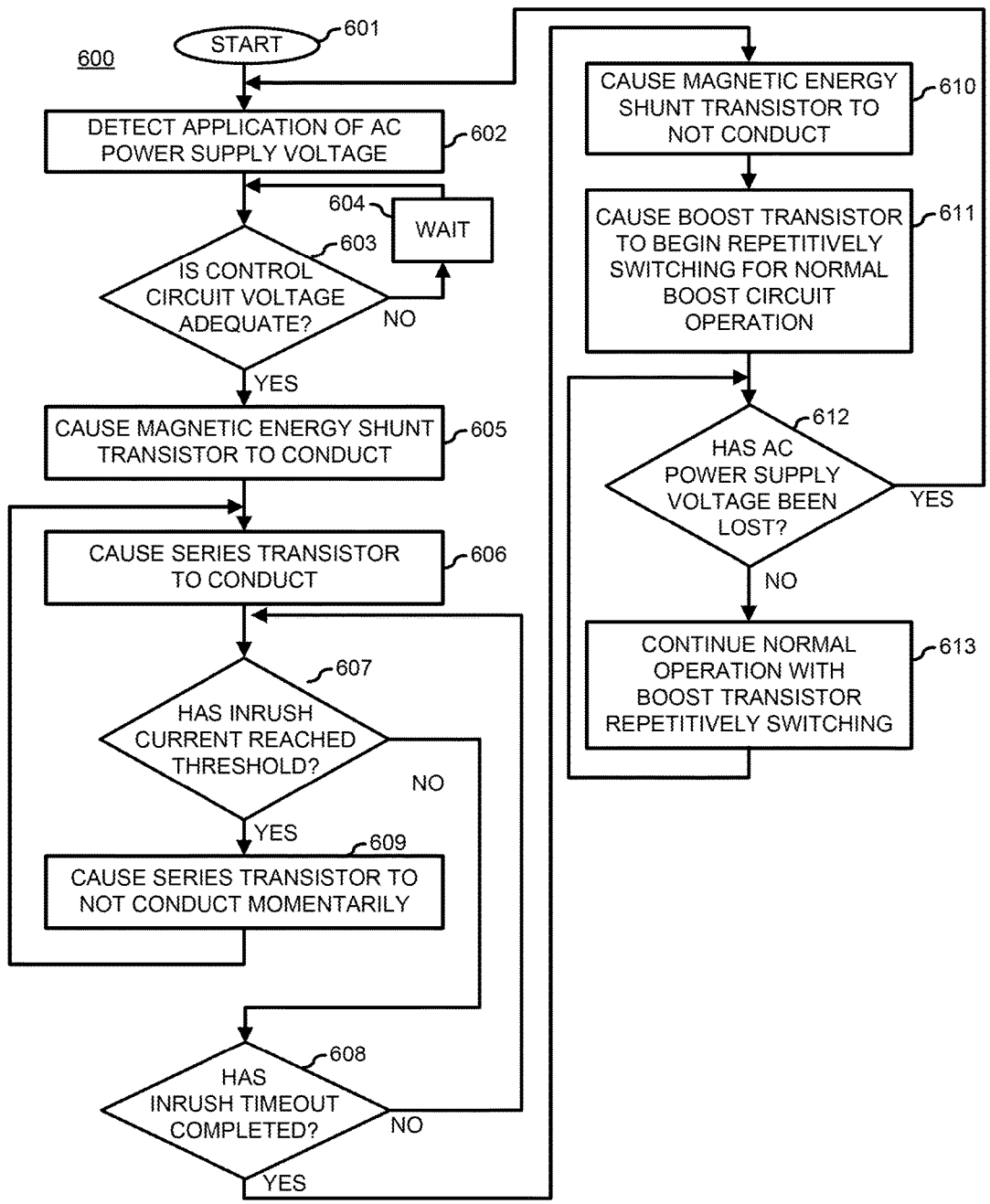
FIG. 6 is a flow diagram illustrating a method according to an embodiment of the present disclosure.

FIG. 6 shows a method according to an embodiment of the present disclosure. Method 600 begins at block 601 and continues to block 602. At block 602, control circuit 207 detects application of an AC power supply voltage. As an example, the application may be an initial application of the AC power supply voltage after a period of time when an information handling system comprising a PSU with the control circuit 207 has been off. As another example, the application may be a resumed application of the AC power supply voltage after a brief disruption of the AC power supply voltage while the information handling system comprising the PSU with the control circuit 207 has been operating.

From block 602, method 600 continues to decision block 603. At decision block 603, a decision is made as to whether or not the control circuit voltage is adequate. For example, in the case of initial application of the AC power supply voltage, the control circuit 207 may be de-energized. If the control circuit voltage is inadequate, method 600 continues to block 604. At block 604, method 600 waits. From block 604, method 600 returns to decision block 603. If the control circuit voltage is adequate, method 600 continues to block 605. For example, if the control circuit supply voltage has had time to rise to a usable level after initial application of AC power supply voltage or if the control circuit supply voltage was already at a usable level which it could sustain until resumed application of the AC power supply voltage, then method 600 can continue to block 605.

At block 605, control circuit 207 causes a magnetic energy shunt transistor to conduct. From block 605, method 600 continues to block 606. At block 606, control circuit 207 causes a series transistor to conduct. From block 606, method 600 continues to decision block 607. At decision block 607, a decision is made as to whether or not the inrush current has reached an inrush current threshold. If the inrush current has reached the inrush current threshold, method 600 continues to block 609. At block 609, control circuit 207 causes the series transistor to not conduct momentarily. From block 609, method 600 returns to block 606 to again cause the series transistor to conduct. If, at decision block 607, the decision is made that the inrush current has not reached the inrush current threshold, method 600 continues to decision block 608. At decision block 608, a decision is made as to whether or not an inrush timeout has been completed.

As inrush current increases rapidly if it is going to reach the inrush current threshold, by waiting a period of time sufficient for inrush current to have time to reach the inrush current threshold if it is going to reach the inrush current threshold but not observing the inrush current as having actually reached the inrush current threshold, it can be determined that the magnitude of the inrush current has subsided to a level that will not reach the inrush current threshold. Also sensing resistor 218 can be used to decide whether inrush current timeout is complete or not. When sensing resistor 218 is positive, which represents input voltage is greater than the voltage of bulk capacitor 215, then the inrush current time can be determined to be complete, with the inrush current having substantially subsided by that time. Thus, the period for determining whether or not the inrush timeout has been completed can be set accordingly. If the inrush timeout has not yet been completed, method 600 returns to decision block 607 to determine again if the inrush current has reached the inrush current threshold. However, if the inrush timeout has been completed, method 600 continues to block 610.

At block 610, control circuit 207 causes the magnetic energy shunt transistor to not conduct and series transistor 208 to keep conducting. From block 610, method 600 continues to block 611. At block 611, control circuit 207 causes a boost transistor to begin repetitively switching for normal boost circuit operation. From block 611, method 600 continues to decision block 612. At decision block 612, a decision is made as to whether or not the AC power supply voltage has been lost. If so, method 600 returns to block 602. If not, method 600 continues to block 613. At block 613, control circuit 207 continues normal operation of the PSU with the boost transistor repetitively switching. From block 613, method 600 returns to decision block 612.

Figure 7:
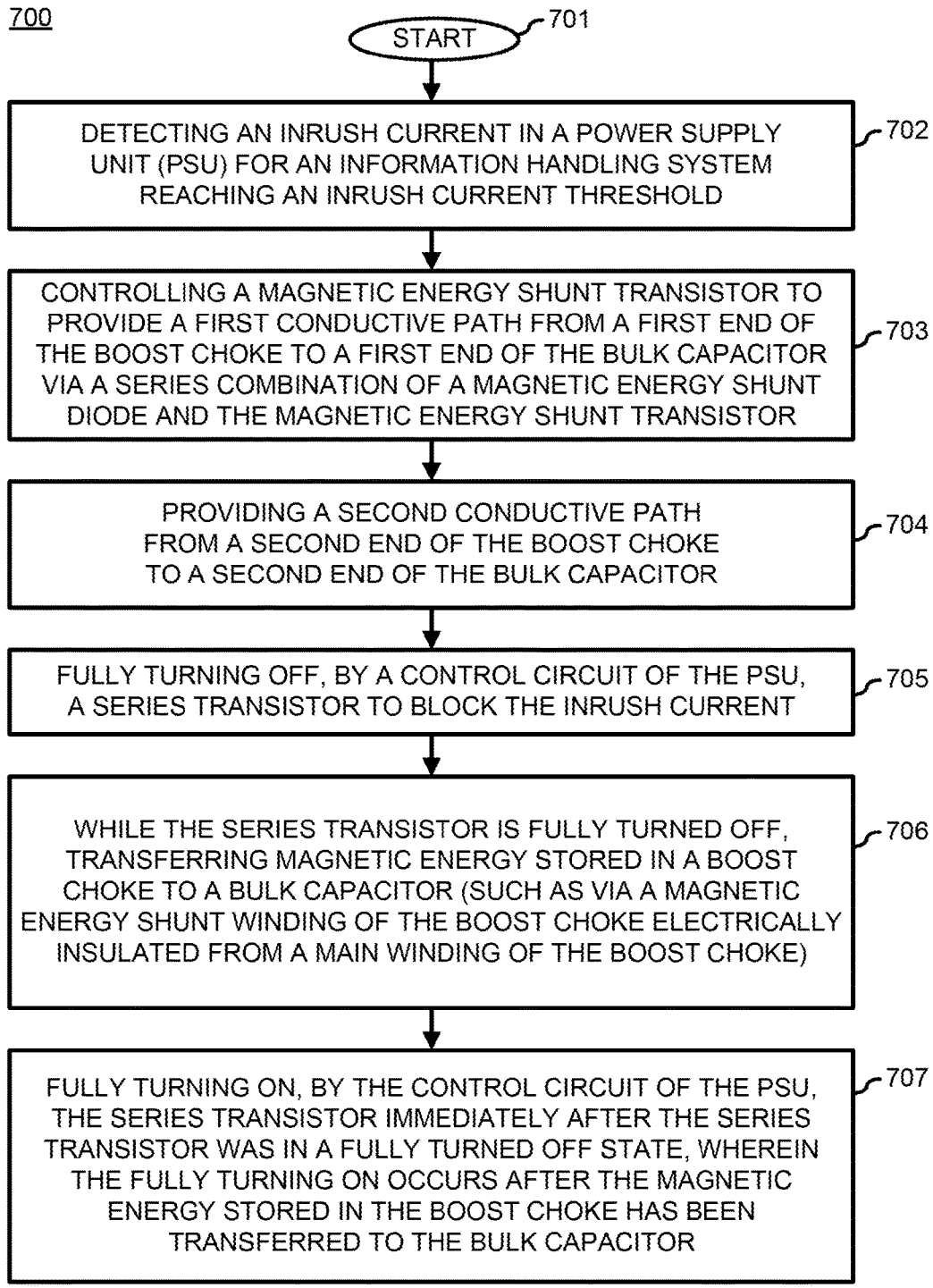
FIG. 7 is a flow diagram illustrating a method according to an embodiment of the present disclosure.

FIG. 7 shows a method according to an embodiment of the present disclosure. Method 700 begins at block 701 and continues to block 702. At block 702, control circuit 207 detects an inrush current in a power supply unit (PSU) for an information handling system reaching an inrush current threshold. From block 702, method 700 continues to block 703. At block 703, control circuit 207 controls a magnetic energy shunt transistor to provide a first conductive path from a first end of the boost choke to a first end of the bulk capacitor via a series combination of a magnetic energy shunt diode and the magnetic energy shunt transistor. From block 703, method 700 continues to block 704. At block 704, a second conductive path is provided from a second end of the boost choke to a second end of the bulk capacitor. From block 704, method 700 continues to block 705. At block 705, upon detecting the inrush current reaching the inrush current threshold, control circuit 207 fully turns off, by a control circuit of the PSU, a series transistor to block the inrush current. From block 705, method 700 continues to block 706. At block 706, while the series transistor is fully turned off, magnetic energy stored in a boost choke is transferred to a bulk capacitor. As an example, the magnetic energy stored in the boost choke can be transferred to the bulk capacitor via a magnetic energy shunt winding of the boost choke electrically insulated from a main winding of the boost choke. A magnetic energy shunt diode and a magnetic energy shunt transistor in series can be coupled the magnetic energy shunt winding of the boost choke, wherein the main winding of the boost choke is coupled to a bridge diode, wherein a boost diode is coupled between the main winding of the boost choke and the magnetic energy shunt winding of the boost choke. From block 706, method 700 continues to block 707. At block 707, control circuit 207 can fully turn on the series transistor again immediately after the series transistor was in a fully turned off state, wherein the fully turning on occurs after the magnetic energy stored in the boost choke has been transferred to the bulk capacitor.

As an example, the control circuit can be further configured to maintain a boost transistor in a non-conducting state and the magnetic energy shunt transistor in a conducting state while a voltage difference between a bridge diode peak voltage and a bulk capacitor voltage is sufficient to result in the inrush current reaching the inrush current threshold. As another example, the control circuit can be further configured to maintain a boost transistor in a non-conducting state while a voltage difference between a bridge diode peak voltage and a bulk capacitor voltage is sufficient to result in the inrush current reaching the inrush current threshold. As another example, the control circuit can be further configured to fully turn off for less than one millisecond the series transistor when the inrush current reaches the inrush current threshold.

Embodiments may be practiced with or without a thermistor in series with the input to the bridge diode. The thermistor may be of a positive temperature coefficient (PTC) or negative temperature (NTC). The thermistor may or may not be shunted by a relay after the inrush current has subsided during normal operation of the PSU. Hold-up time refers to the time the DC-DC converter fed by the PSU bulk capacitor can maintain its output voltages. After the hold-up time, the PSU bulk capacitor reaches a critically low voltage, and the DC-DC converter shuts down, causing the computer powered by the PSU to shut down abruptly.

A PFC choke is used to boost the DC voltage from the output of the bridge diode to a higher DC voltage applied to the PSU bulk capacitor via a PFC diode according to V=Ldi/dt as the boost transistor switches to provide the di/dt. However, uncontrolled inrush current, being of much larger magnitude than the normal steady-state current, could magnify the di/dt and thus the V, which could exceed the maximum drain-source voltage (Vds) of the boost transistor and damage the boost transistor. Uncontrolled inrush current could reach a magnitude in excess of the more linear typical operating region of the PFC choke and into the nonlinear saturation region of the PFC choke, which could override the PFC choke's ability to limit current based on the PFC choke's opposition to changes in current, thereby causing the boost transistor to switch much more current than normal, risking damage to the boost transistor. Such difficulties can be avoided in accordance with at least one embodiment disclosed herein.

In accordance with at least one embodiment, when the series transistor is conducting, current can flow through the PFC choke. When the current begins to flow, the instantaneously high V=Ldi/dt across the PFC choke resulting from the instantaneously high di/dt opposes initial current flow. Current flow through the PFC choke increases by i=V/L×t, where t is on time of series transistor, until the inrush current detector detects the inrush current exceeding the inrush current threshold and opens the series transistor to prevent saturation of the PFC choke. By keeping the boost transistor non-conducting while the series transistor is conducting, current can flow through the boost diode to charge the bulk capacitor.

In accordance with at least one embodiment, charging of the bulk capacitor in an initial in-rush or re-rush situation occurs through rapid switching of the series transistor to utilize the PFC choke's high initial opposition to current flow based on the high di/dt of the switching to effectively limit the inrush current for both initial inrush current and resumed inrush current. After the series transistor repetitively disconnects current flow for, for example 100 µS when the inrush current exceeds the inrush current threshold, the series transistor then reconnects current flow, allowing inrush current to begin to increase while being initially opposed by the PFC choke. After a certain amount of time, for example 80 µS, the inrush current increases to the point where it reaches the inrush current threshold, and the series transistor again opens to disconnect the current flow. As a result, enough average current is provided over the combined period of, for example 80 µS of current flowing and the, for example 100 µS of zero current to gradually recharge the bulk capacitor over, for example 25 mS, even as the load continues to draw current from the bulk capacitor, providing uninterrupted power to the information handling system powered by the PSU. The series transistor off time, exemplified as 100 µS above, may be a variable amount of time which can vary in response to the output current. Such responsiveness to output current can provide a faster charging time for higher average current. As an example, increased output current from 0% to 100% can reduce a variable series transistor off time from 100 µS to 20 µS.

In accordance with at least one embodiment, a circuit for a PSU suitable for powering an information handling system comprises a bridge diode, a boost choke, a boost transistor, a boost diode, a bulk capacitor, a series transistor, and a control circuit. The boost choke is coupled to the bridge diode. The boost transistor is coupled to the boost choke. The boost diode is coupled to the boost choke and to the boost transistor. The bulk capacitor is coupled to the boost diode. The control circuit is coupled to the series transistor. The control circuit is configured to fully turn on the series transistor until an inrush current reaches an inrush current threshold and to fully turn off the series transistor when the inrush current reaches the inrush current threshold. Magnetic energy stored in the boost choke is transferred to the bulk capacitor while the series transistor is fully turned off. The control circuit is further configured to fully turn on the series transistor again immediately after the series transistor was in a fully turned off state. The fully turning on the series transistor again occurs after the magnetic energy stored in the boost choke has been transferred to the bulk capacitor.

In accordance with at least one embodiment, the circuit further comprises a magnetic energy shunt diode and a magnetic energy shunt transistor. The magnetic energy shunt diode and the magnetic energy shunt transistor are coupled in series with each other and are coupled to the boost choke and to the bulk capacitor. In accordance with at least one embodiment, the control circuit is further configured to maintain the boost transistor in a non-conducting state and the magnetic energy shunt transistor in a conducting state while a voltage difference between a bridge diode peak voltage and a bulk capacitor voltage is sufficient to result in the inrush current reaching the inrush current threshold. In accordance with at least one embodiment, the magnetic energy shunt diode and the magnetic energy shunt transistor in series are coupled a magnetic energy shunt winding of the boost choke, wherein a main winding of the boost choke is coupled to the bridge diode. In accordance with at least one embodiment, the boost diode is coupled between the main winding of the boost choke and the magnetic energy shunt winding of the boost choke. In accordance with at least one embodiment, the control circuit is further configured to maintain the boost transistor in a non-conducting state while a voltage difference between a bridge diode peak voltage and a bulk capacitor voltage is sufficient to result in the inrush current reaching the inrush current threshold. In accordance with at least one embodiment, the control circuit is further configured to fully turn off for less than one millisecond the series transistor when the inrush current reaches the inrush current threshold.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality. The information handling system can include memory (volatile (such as random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
   detecting an inrush current in a power supply unit (PSU) for an information handling system reaching an inrush current threshold;
   upon detecting the inrush current reaching the inrush current threshold, fully turning off, by a control circuit of the PSU, a series transistor to block the inrush current;
   while the series transistor is fully turned off, transferring magnetic energy stored in a boost choke to a bulk capacitor; and
   fully turning on, by the control circuit of the PSU, the series transistor again immediately after the series transistor was in a fully turned off state, wherein the fully turning on occurs after the magnetic energy stored in the boost choke has been transferred to the bulk capacitor.

2. The method of claim 1, further comprising:
   controlling a magnetic energy shunt transistor to provide a first conductive path from a first end of the boost choke to a first end of the bulk capacitor via a series combination of a magnetic energy shunt diode and the magnetic energy shunt transistor; and
   providing a second conductive path from a second end of the boost choke to a second end of the bulk capacitor.

3. The method of claim 2, wherein the control circuit is further configured to maintain a boost transistor in a non-conducting state and the magnetic energy shunt transistor in a conducting state while a voltage difference between a bridge diode peak voltage and a bulk capacitor voltage is sufficient to result in the inrush current reaching the inrush current threshold.

4. The method of claim 1, wherein the, while the series transistor is fully turned off, transferring the magnetic energy stored in the boost choke to the bulk capacitor comprises:
   transferring the magnetic energy stored in the boost choke to the bulk capacitor via a magnetic energy shunt winding of the boost choke electrically insulated from a main winding of the boost choke, wherein a magnetic energy shunt diode and a magnetic energy shunt transistor in series are coupled the magnetic energy shunt winding of the boost choke, wherein the main winding of the boost choke is coupled to a bridge diode, wherein a boost diode is coupled between the main winding of the boost choke and the magnetic energy shunt winding of the boost choke.

5. The method of claim 1, wherein the control circuit is further configured to maintain a boost transistor in a non-conducting state while a voltage difference between a bridge diode peak voltage and a bulk capacitor voltage is sufficient to result in the inrush current reaching the inrush current threshold.

6. The method of claim 1, wherein the control circuit is further configured to fully turn off for less than one millisecond the series transistor when the inrush current reaches the inrush current threshold.

7. A circuit comprising:
   a bridge diode;
   a boost choke coupled to the bridge diode;
   a boost transistor coupled to the boost choke;
   a boost diode coupled to the boost choke and to the boost transistor;
   a bulk capacitor coupled to the boost diode;
   a series transistor coupled in series between the bridge diode and the bulk capacitor; and a control circuit coupled to the series transistor, the control circuit configured to fully turn on the series transistor until an inrush current reaches an inrush current threshold and to fully turn off the series transistor when the inrush current reaches the inrush current threshold, wherein magnetic energy stored in the boost choke is transferred to the bulk capacitor while the series transistor is fully turned off, wherein the control circuit is further configured to fully turn on the series transistor again immediately after the series transistor was in a fully turned off state, wherein the fully turning on the series transistor again occurs after the magnetic energy stored in the boost choke has been transferred to the bulk capacitor.

8. The circuit of claim 7, further comprising:
a magnetic energy shunt diode; and
a magnetic energy shunt transistor, the magnetic energy shunt diode and the magnetic energy shunt transistor coupled in series with each other and coupled to the boost choke and to the bulk capacitor.

9. The circuit of claim 8, wherein the control circuit is further configured to maintain the boost transistor in a non-conducting state and the magnetic energy shunt transistor in a conducting state while a voltage difference between a bridge diode peak voltage and a bulk capacitor voltage is sufficient to result in the inrush current reaching the inrush current threshold.

10. The circuit of claim 7, wherein the magnetic energy shunt diode and the magnetic energy shunt transistor in series are coupled a magnetic energy shunt winding of the boost choke, wherein a main winding of the boost choke is coupled to the bridge diode.

11. The circuit of claim 7, wherein the boost diode is coupled between the main winding of the boost choke and the magnetic energy shunt winding of the boost choke.

12. The circuit of claim 7, wherein the control circuit is further configured to maintain the boost transistor in a non-conducting state while a voltage difference between a bridge diode peak voltage and a bulk capacitor voltage is sufficient to result in the inrush current reaching the inrush current threshold.

13. The circuit of claim 7, wherein the control circuit is further configured to fully turn off for less than one millisecond the series transistor when the inrush current reaches the inrush current threshold.

14. A power supply unit (PSU) comprising:
a bridge diode;
a boost choke coupled to the bridge diode;
a boost transistor coupled to the boost choke;
a boost diode coupled to the boost choke and to the boost transistor;
a bulk capacitor coupled to the boost diode;
a series transistor coupled in series between the bridge diode and the bulk capacitor; and
a control circuit coupled to the series transistor, the control circuit configured to fully turn on the series transistor until an inrush current reaches an inrush current threshold and to fully turn off the series transistor when the inrush current reaches the inrush current threshold, wherein magnetic energy stored in the boost choke is transferred to the bulk capacitor while the series transistor is fully turned off, wherein the control circuit is further configured to fully turn on the series transistor again immediately after the series transistor was in a fully turned off state, wherein the fully turning on the series transistor again occurs after the magnetic energy stored in the boost choke has been transferred to the bulk capacitor.

15. The PSU of claim 14, further comprising:
a magnetic energy shunt diode; and
a magnetic energy shunt transistor, the magnetic energy shunt diode and the magnetic energy shunt transistor coupled in series with each other and coupled to the boost choke and to the bulk capacitor.

16. The PSU of claim 15, wherein the control circuit is further configured to maintain the boost transistor in a non-conducting state and the magnetic energy shunt transistor in a conducting state while a voltage difference between a bridge diode peak voltage and a bulk capacitor voltage is sufficient to result in the inrush current reaching the inrush current threshold.

17. The PSU of claim 14, wherein the magnetic energy shunt diode and the magnetic energy shunt transistor in series are coupled a magnetic energy shunt winding of the boost choke, wherein a main winding of the boost choke is coupled to the bridge diode.

18. The PSU of claim 14, wherein the boost diode is coupled between the main winding of the boost choke and the magnetic energy shunt winding of the boost choke.

19. The PSU of claim 14, wherein the control circuit is further configured to maintain the boost transistor in a non-conducting state while a voltage difference between a bridge diode peak voltage and a bulk capacitor voltage is sufficient to result in the inrush current reaching the inrush current threshold.

20. The PSU of claim 14, wherein the control circuit is further configured to fully turn off for less than one millisecond the series transistor when the inrush current reaches the inrush current threshold.

* * * * *